(12) United States Patent
Held et al.

(10) Patent No.: US 10,591,271 B2
(45) Date of Patent: Mar. 17, 2020

(54) METHOD AND APPARATUS FOR CALIBRATING A ROTATING DEVICE ATTACHED TO A MOVABLE PART OF A COORDINATE MEASURING DEVICE

(71) Applicant: CARL ZEISS INDUSTRIELLE MESSTECHNIK GMBH, Oberkochen (DE)

(72) Inventors: Tobias Held, Noerdlingen (DE); Rainer Sagemueller, Fachsenfeld (DE); Dominik Seitz, Schwaebisch Gmuend (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 160 days.

(21) Appl. No.: 15/701,810

(22) Filed: Sep. 12, 2017

(65) Prior Publication Data

US 2017/0370690 A1    Dec. 28, 2017

Related U.S. Application Data

(63) Continuation of application No. PCT/EP2016/056164, filed on Mar. 21, 2016.

(30) Foreign Application Priority Data

Mar. 26, 2015    (DE) .................... 10 2015 205 567

(51) Int. Cl.
*G01B 5/012* (2006.01)
*G01B 21/04* (2006.01)

(52) U.S. Cl.
CPC ........... *G01B 5/012* (2013.01); *G01B 21/042* (2013.01)

(58) Field of Classification Search
None
See application file for complete search history.

(56) References Cited

U.S. PATENT DOCUMENTS 5,138,563 A    8/1992    Debitsch et al.
5,832,416 A    11/1998    Anderson
(Continued)

FOREIGN PATENT DOCUMENTS

CN    101023322 A    8/2007
CN    101539400 A    9/2009
(Continued)

OTHER PUBLICATIONS

International Search Report for PCT/EP2016/056164; dated Jun. 3, 2016; 3 pp.

(Continued)

*Primary Examiner* — Paul M. West
*Assistant Examiner* — Mark A Shabman
(74) *Attorney, Agent, or Firm* — Harness, Dickey & Pierce, P.L.C.

(57) ABSTRACT

A method for calibrating a rotating device attached to a movable part of a coordinate measuring device having a first part secured to the movable part and a second part rotatable relative to the first part about an axis of rotation of the turning device, on which second part a measuring sensor for measuring workpieces can be attached. The rotating device or a body connected to the second part is moved to a local area of a position determining device by a drive system of the coordinate measuring device, which position measuring device is connected to the coordinate measuring device, by means of at least one sensor of the position determining device. A position of the rotating device or of the body connected to the second part is determined relative to the (Continued)

position determining device, and the rotating device is calibrated in accordance with the determined position.

10 Claims, 5 Drawing Sheets

(56) References Cited

U.S. PATENT DOCUMENTS

| | | | |
|---|---|---|---|
| 8,537,372 | B2 | 9/2013 | Pettersson et al. |
| 8,607,466 | B2 | 12/2013 | Pettersson et al. |
| 2001/0025427 | A1* | 10/2001 | Lotze .................. G01B 21/045 33/559 |
| 2009/0024343 | A1* | 1/2009 | Balsamo ............... G01B 21/042 702/95 |
| 2010/0286812 | A1 | 11/2010 | Slettemoen et al. |
| 2011/0040523 | A1 | 2/2011 | Matsushita |
| 2012/0105866 | A1* | 5/2012 | Pettersson ............ G01B 21/045 356/601 |
| 2012/0246953 | A1 | 10/2012 | Engel |
| 2012/0281104 | A1 | 11/2012 | Ohmiya et al. |
| 2014/0167745 | A1 | 6/2014 | Held et al. |
| 2014/0236520 | A1 | 8/2014 | Engel et al. |
| 2015/0049186 | A1 | 2/2015 | Pettersson et al. |
| 2015/0051727 | A1 | 2/2015 | Hasegawa |
| 2017/0234681 | A1 | 8/2017 | Held et al. |

FOREIGN PATENT DOCUMENTS

| | | |
|---|---|---|
| CN | 102472615 A | 5/2012 |
| CN | 102686974 A | 9/2012 |
| CN | 102714696 A | 10/2012 |
| CN | 103782130 A | 5/2014 |
| CN | 103827637 A | 5/2014 |
| DE | 40 01 433 A1 | 7/1991 |
| DE | 100 06 753 A1 | 8/2001 |
| DE | 101 24 275 A1 | 12/2002 |
| DE | 103 39 194 A1 | 3/2005 |
| DE | 10 2008 028 986 A1 | 12/2009 |
| DE | 100 66 470 B4 | 9/2011 |
| DE | 102011056819 A1 | 10/2012 |
| DE | 10 2013 200 210 B3 | 6/2014 |
| DE | 10 2013 208 397 A1 | 11/2014 |
| EP | 1 126 237 A2 | 8/2001 |
| EP | 1 624 282 A2 | 2/2006 |
| JP | 2000067473 A | 3/2000 |
| WO | 2009/038465 A1 | 3/2009 |
| WO | 2009/152962 A2 | 12/2009 |

OTHER PUBLICATIONS

English translation of International Preliminary Report on Patentability for PCT/EP2016/056164; 7 pp.

Yuan Maoqiang; Research on 3-DOF Displacement Measurement and Error Propagation Analysis of Compensation System; Jun. 2014; 93 pp.

Nian Xingling; Research on Structural Design and Error Analysis of Mobile Bridge Coordinate Measuring Machines; Mar. 2012; 58 pp.

Junjie Wu; Development of 3D Micro Tactile Probe for Nano Measuring Machine; Mar. 2014; 84 pp.

* cited by examiner

METHOD AND APPARATUS FOR CALIBRATING A ROTATING DEVICE ATTACHED TO A MOVABLE PART OF A COORDINATE MEASURING DEVICE

CROSS-REFERENCE OF RELATED APPLICATIONS

This application is a continuation application of International patent application PCT/EP2016/056164, filed Mar. 21, 2016, which claims the priority of German patent application DE 10 2015 205 567.1, filed Mar. 26, 2015. The entire contents of these priority applications are incorporated herein by reference.

BACKGROUND OF THE INVENTION

The invention relates to a method and an arrangement for calibrating a rotary apparatus mounted on a movable part of a coordinate measuring machine.

It is known to use coordinate measuring machines (abbreviated to CMM) to determine coordinates of workpieces. Here, in some cases, a rotary apparatus is used which can bring the sensor, which is mounted on the movable part of the CMM, into different rotary positions. The sensor, which is in turn mounted on the rotary apparatus, may for example be a tactile probe for probing the surface of workpieces, that is to say, upon contact with the surface, using the measuring system of the coordinate measuring machine, the position of the tactile probe is determined (for example through the use of a measuring head which is mounted on the rotary apparatus and which bears the probe), and from this, the coordinates of the probed surface point are determined. Alternatively or in addition, however, other sensors, for example optical, capacitive and/or magnetic sensors, are arranged on the rotary apparatus in order to measure the workpiece.

A calibration of the rotary apparatus is necessary for various reasons. In particular, by means of the calibration, the geometry of the rotary apparatus and the relative position thereof and/or the relative orientation thereof with respect to the movable part of the coordinate measuring machine are determined or checked. These variables may however change over time and/or as a result of renewed mounting of the rotary apparatus on the coordinate measuring machine in relation to an earlier operating state. Changes in geometry (that is to say changes in shape and/or dimensions) over the course of time can be attributed to changes in temperature and to wear. The calibration should therefore be performed repeatedly.

The changes may have different effects in the different rotary positions. This may be due in particular to the fact that the orientation and/or position of the axis of rotation changes differently over the course of time for the different rotary positions, or the orientations and/or positions of multiple axes of rotation of the rotary apparatus change differently over the course of time for the various combinations of the rotary positions with respect to the multiple axes of rotation. In general, the rotary movements about the respective axis of rotation are not ideal rotary movements. For example, the orientation of an axis of rotation of the rotary apparatus changes during the rotational movement of those two parts of the rotary apparatus which are movable relative to one another about the axis of rotation.

Therefore, for the calibration of rotary apparatuses, it is customary for such rotary apparatuses to be brought into multiple different rotary positions and for measurement information for the calibration to be captured in each case. This increased measurement outlay is a major reason why the calibration is a lengthy process, which takes considerably longer still in the case of rotary apparatuses with multiple axes of rotation (for example so-called rotary/pivot joints) because, for the capture of the measurement information, different rotary positions with respect to one of the axes of rotation are combined with different rotary positions with respect to another axis of rotation. The long duration gives rise to additional inaccuracies of the calibration if the boundary conditions (in particular the temperature distribution) change during the calibration. Rotary/pivot joints are known for example from EP 1 624 282 A2.

It is known for a calibration body, in particular a sphere, to be fastened to a holding device which is positioned, along with the workpiece to be measured by means of the CMM, on a base of the CMM. In particular if the holding device and the calibration body are not influenced, or are influenced only to a minor extent, by temperature changes, the calibration body forms a good position reference. By means of a sensor mounted on the rotary apparatus, the calibration body is probed in tactile fashion at various points on its surface by the probe for calibration, or is scanned contactlessly, and the coordinates of at least one characteristic point of the calibration body are determined from the measurement values of the measuring system. Changes in the geometry of the rotary apparatus and changes in the relative position thereof and/or relative orientation thereof with respect to the movable part of the CMM, lead to apparent deviations of the position of the characteristic point from the expected position thereof. Consequently, the rotary apparatus can be calibrated utilizing the information regarding the deviations. A holding device for holding a calibration body, and a method for calibrating a measuring sensor of a CMM, are known for example from WO 2009/152962 A2.

Owing to the capture of measurement information at multiple surface points of the calibration body, the calibration outlay in the case of rotary apparatuses is particularly high. To take into account the changes in geometry, use may be made in particular of computing models. Such computing models commonly have a multiplicity of parameters, for the determination of which a large number of measurement values is required. For example, a computing model of said type is initialized by means of the calibration. In particular, starting values of the computing model are determined by means of the calibration. For example, by measurement of temperature changes over the course of time and/or measurement of temperature gradients or temperature differences at various locations, further information can be obtained for the computing model, and the change in geometry that has occurred since the initialization can be calculated by means of the computing model.

In particular, for the calibration of the rotary apparatus, use is always made of the same probe, which is connected to the rotary apparatus and by means of which the surface of the calibration body is probed.

It is an object of the present invention to specify a method and an arrangement for calibrating a rotary apparatus mounted on a movable part of a coordinate measuring machine, by means of which the outlay for the calibration can be reduced.

SUMMARY OF THE INVENTION

It is proposed that, in addition to the measuring system of the coordinate measuring machine (abbreviated to CMM), use be made of a position determining device for the calibration of the rotary apparatus. The position determining device is connected to a base of the CMM. During the measurement operation of the CMM, the workpiece to be measured is also connected to the base (for example a measuring table), in particular directly or indirectly (for example via a rotary table). The position determining device may be connected to the base directly or indirectly via further components. An indirect connection may for example have a movement device (for example a rotary apparatus) by means of which the position determining device can be moved relative to the base. The movement device is however in particular independent of the drive system of the CMM, by means of which the movable part of the CMM, on which the rotary apparatus is mounted, is moved. Furthermore, the movable part of the CMM can be moved independently of the movement device. Therefore, the position determining device can remain in the same movement position while the rotary apparatus is moved by means of a movement of the movable part.

The base (for example a measuring table on which the workpiece to be measured is arranged) may be a positionally fixed base, such as is the case in coordinate measuring machines of portal design, for example. This means that the base is not moved when the movable part of the CMM is moved in order to move the rotary apparatus. That part of the CMM to which the rotary apparatus is attached may however alternatively or additionally be movable relative to a movable base by virtue of the base being moved. This is the case for example in CMMs with movable measuring tables. Therefore, the movable part of the CMM may be movable relative to the base only by virtue of the base being movable relative to the movable part.

The position determining device has at least one sensor which is designed to determine a relative position of the rotary apparatus relative to the position determining device. In particular, the sensor may be designed to determine the distance of the rotary apparatus, or of a body connected thereto (for example of a probe mounted on the rotary apparatus), to the sensor or to some other part of the position determining device, in particular in a determination direction of the sensor. The relative position may for example be determined in that the sensor confirms that the rotary apparatus, or the body connected thereto, is situated at a predefined expected position relative to the position determining device. Alternatively or in addition, the sensor may be designed and/or used to measure the relative position and in particular the distance. In this case, the sensor of the position determining device can, within a spatial region of the position determining device, generate different measurement values of the relative position depending on the relative position in which the rotary apparatus, or the body connected thereto, is actually situated. The spatial region is that region in which the rotary apparatus, or the body connected thereto, can be situated such that the sensor can measure the relative position. For example, the sensor is calibrated and/or approved for measurements within the spatial region, and/or the sensor provides unique measurement results only within the spatial region (that is to say any position within the spatial region provides an individual measurement value uniquely assigned to the position).

The position determining device preferably has a multiplicity of the sensors. This makes it possible for the relative position to be determined redundantly and thus with greater reliability, and/or for the relative position to be determined with respect to different determination directions. In particular, it is thus possible with multiple sensors to determine the relative position with respect to two or three linear degrees of freedom of the movement (that is to say degrees of freedom with respect to in each case one straight line which runs in the determination direction), wherein the degrees of freedom are mutually independent. The position determining device may however alternatively have, for example, sensors for determining the relative position with respect to more than three rotary and/or linear degrees of freedom of the movement.

The position determining device with the at least one sensor permits, in particular in the manner described, the determination of a relative position of the rotary apparatus with respect to the position determining device. If the position and/or orientation of the position determining device with respect to the base is known, it is possible by means of the determined relative position to also determine the corresponding position of the rotary apparatus with respect to the base. This in turn can be utilized to calibrate the rotary apparatus. In particular, it is possible here to follow an analogous approach to that used in the calibration of a rotary apparatus by measuring a calibration object. For example, after the probing of a calibration sphere at various surface points by means of a tactile probe arranged on the rotary apparatus, the sphere central point can be determined. The position of the sphere central point represents a mean value of the positions of the probed surface points. If the geometry of the rotary apparatus, or the position and/or orientation thereof on the movable part of the coordinate measuring machine, has changed, a correspondingly changed position of the sphere central point is determined by probing or by contactless scanning of the calibration sphere. In the case of the additional position determining device, this corresponds to a changed relative position of the rotary apparatus with respect to the position determining device. For example, a position corrective value may be calculated which is equal to the difference between the earlier position value and the changed position value. It is however also possible for the result of the determination of the relative position to be utilized for a correction of the rest of the movement mechanism of the CMM, for example as a guidance defect correction, that is to say to calibrate the rotary apparatus indirectly.

As already mentioned, the position and/or orientation of the rotary apparatus with respect to the movable part of the CMM may vary. In particular if the movable part is connected to a change-over interface for the replacement of the rotary apparatus, renewed fitting of the same rotary apparatus leads to a changed position and/or orientation. In particular, change-over interfaces exist in the case of which the rotary positions of that part of the rotary apparatus which is mounted on the change-over interface about a virtual axis of rotation, which is for example an axis of symmetry of the change-over interface, may vary. Variations in the range of one arc second, for example, occur in practice. For example, if a stylus is arranged on the rotary apparatus, the shank longitudinal axis of which stylus extends transversely with respect to the virtual axis of rotation, a variation of the rotary position by one arc second in the case of shank lengths in the range of 10 cm leads to position deviations of the probe element of the stylus in the range of around one half of one micrometer. With a calibration which can be performed in a short time using the position determining device, such a position deviation can be quickly compensated by calibration. The calibration can be performed repeatedly with little outlay.

If a CMM has been shut down and is now being prepared for operation, the temperature changes relatively quickly, and relatively steep temperature gradients occur. If a rotary apparatus is calibrated in this warm-up phase, a greater calibration error is to be expected than after the warm-up phase. The fast calibration using the position determining device makes it possible for calibration to be performed repeatedly during the warm-up phase. In particular, calibration may be performed once or repeatedly even after the warm-up phase, without considerably shortening the time available for the measurement operation. Using this example, it can be illustrated that the calibration using the position determining device can be combined with a calibration by probing and/or scanning of a calibration object. For example, firstly, a calibration is performed by probing and/or scanning a calibration body, and before, during and/or after this, a calibration is performed by means of the position determining device. If it can be assumed that the state has not changed significantly between the execution of the two types of calibration, the calibration by probing of the calibration body forms a reference for the calibration using the position determining device. By repeating the calibration using the position determining device, it can be quickly determined how the geometry, position and/or orientation of the rotary apparatus has changed relative to the reference time. The calibration using the position determining device may also be performed between the instances of probing and/or scanning of various surface points of the calibration body.

The calibration of a rotary apparatus mounted on a movable part of a coordinate measuring machine is to be understood generally to mean that information relating to the geometry (for example length of the rotary apparatus and/or relative position of different axes of rotation) of the rotary apparatus and/or relating to the relative position thereof (for example position on a change-over plate for the coupling of different rotary apparatuses) and/or the orientation thereof (for example orientation of an axis of rotation) with respect to the movable part of the coordinate measuring machine is obtained, wherein the information obtained is made available for the operation of the CMM using the rotary apparatus.

In particular, the following is proposed: A method for calibrating a rotary apparatus mounted on a movable part of a coordinate measuring machine, which rotary apparatus has a first part, which is fastened to the movable part of the coordinate measuring machine, and a second part which is rotatable relative to the first part about an axis of rotation of the rotary apparatus and on which a measuring sensor for measuring workpieces is mountable, wherein
    the rotary apparatus, or a body connected to the second part, is moved, by operation of a drive system of the coordinate measuring machine, into a spatial region of a position determining device which is connected to a base of the coordinate measuring machine,
    a position of the rotary apparatus (for example a position of the second part), or of the body connected to the second part, relative to the position determining device is determined by means of at least one sensor of the position determining device, and
    the rotary apparatus is calibrated taking account of the determined position.

Also proposed is an arrangement for calibrating a rotary apparatus mounted on a movable part of a coordinate measuring machine, wherein the arrangement has:
    the coordinate measuring machine, wherein the coordinate measuring machine has a base relative to which the movable part is movable by operation of a drive system of the coordinate measuring machine,
    the rotary apparatus, which is mounted with a first part on the movable part of the coordinate measuring device and which has a second part, which second part is rotatable relative to the first part about an axis of rotation of the rotary apparatus and on which second part a measurement sensor for measuring workpieces is mountable,
    a measuring system of the coordinate measuring machine, which measuring system, during a measurement operation of the coordinate measuring machine for determining coordinates of workpieces, measures movement positions of the movable part,
    a position determining device which is provided in addition to the measuring system of the coordinate measuring machine, which is connected to the base of the coordinate measuring machine and which has at least one position sensor for determining a position of the rotary apparatus (for example a position of the second part) or of a body connected to the second part,
    a controller of the coordinate measuring machine, which controller is designed to move the rotary apparatus, or the body connected to the second part, by operation of the drive system of the coordinate measuring machine, into a spatial region of the position determining device such that the position of the rotary apparatus (for example the position of the second part), or of the body connected to the second part, relative to the position determining device is determined by means of the at least one position sensor,
    a calibrating device which is designed to calibrate the rotary apparatus taking account of the determined position.

During the calibration using the position determining device, it can occur, as has already been described above, that the rotary apparatus, owing to changes in its geometry, in its relative position and/or in its relative orientation with respect to the movable part of the coordinate measuring machine (abbreviated to CMM), is situated in a different relative position with respect to the position determining device than previously (during a previous calibration), and this is then measured by the position determining device. Therefore, by contrast to the probing and/or scanning of a calibration body, two different measurement principles are obtained, which may however also be combined with one another.

In accordance with one measurement principle, the rotary apparatus or the body connected thereto is, similarly to the approach during the probing and/or scanning of a calibration body, always positioned at the same relative position with respect to the base or with respect to the position determining device, and the information required for the calibration is obtained from the measurement system of the CMM. In one specific embodiment, the rotary apparatus, or the body connected thereto, is moved to a predefined position in a coordinate system of the position determining device, and, by means of a measuring system of the coordinate measuring machine, which measuring system is provided in addition to the position determining device and which measuring system, during a measurement operation of the coordinate measuring machine for determining coordinates of workpieces, measures movement positions of the movable part, it is measured what movement position the movable part with the rotary apparatus mounted thereon is situated at while the rotary apparatus, or the body connected thereto, is at the predefined position. The rotary apparatus is calibrated taking account of the measured movement position. This corresponds to an embodiment of the arrangement in which the controller is designed to move the rotary apparatus, or the body connected thereto, to a predefined position in a coordinate system of the position determining device, wherein the measuring system of the coordinate measuring machine is designed to measure what movement position the movable part with the rotary apparatus mounted thereon is situated at while the rotary apparatus, or the body connected thereto, is at the predefined position, and wherein the calibrating device is designed to calibrate the rotary apparatus taking account of the measured movement position.

In accordance with the second measurement principle, the rotary apparatus or the body connected thereto is, during different calibration processes, always positioned at the same movement position of the movable part of the CMM, which possibly leads to a changed relative position with respect to the position determining device. The movement position is determined from the measurement information provided by the measurement system of the CMM. As mentioned, said measurement principle may also be combined with the first measurement principle. In the case of the combination, it is in particular the case that both the measurement system of the CMM and the at least one sensor of the position determining device each generates at least one measurement value, from which the movement position of the movable part of the CMM and the position of the rotary apparatus, or of the body connected thereto, can be determined and used for the calibration.

In one specific refinement of the second measurement principle, the movable part with the rotary apparatus mounted thereon is moved into a predefined position in a coordinate system of the coordinate measuring machine, and in the predefined position, the relative position of the rotary apparatus, or of the body connected thereto, relative to the position determining device is determined. This corresponds to an embodiment of the arrangement in which the controller is designed to move the movable part with the rotary apparatus mounted thereon into a predefined position in a coordinate system of the coordinate measuring machine, wherein the position determining device is designed to, in the predefined position, determine the position of the rotary apparatus, or of the body connected thereto, relative to the position determining device.

Since, in the implementation of each of the two measurement principles, and also in the case of a combination of the two measurement principles, the rotary apparatus, or the body connected thereto, only has to be positioned at a single position in the spatial region of the position determining device in order to obtain the information required for the calibration of the rotary apparatus (which information is provided by the at least one position sensor of the position determining device), time is saved in relation to the probing and/or scanning of a calibration object at various surface positions. It is therefore possible in particular for the calibration to be performed more quickly and/or more frequently. In particular, similarly to the approach in the known calibration of a rotary apparatus using a calibration body, the rotary apparatus is brought into different rotary positions with respect to its at least one axis of rotation, and, for each of said rotary positions, or for the combination of rotary positions with respect to multiple axes of rotation, the rotary apparatus, or the body connected to the second part, is positioned in the spatial region of the position determining device, and calibration information is obtained in this way. In particular, for each rotary position or for each combination of rotary positions with respect to different axes of rotation, calibration information is obtained only for a single position in the spatial region of the position determining device.

In particular, for this purpose, the controller carries out a process which can be referred to as position regulation. The controller receives, from the position determining device, information regarding the present relative position of the rotary apparatus or of the body connected thereto, and, utilizing said information, moves the rotary apparatus, or the body connected thereto, into the predefined position in the coordinate system of the position determining device. Alternatively, the controller or the rotary apparatus or the body connected thereto may move within the spatial region of the position determining device for example along a predefined movement path (for example a spiral-shaped movement path) on which the predefined position is highly probably situated. If the predefined position has been reached, the position determining device generates a signal to the measuring system of the CMM, and the present measurement values or the present measurement value of the measuring system are/is detected as movement position, which corresponds to the predefined position of the rotary apparatus, or of the body connected thereto, in the coordinate system of the position determining device. The first measurement principle also has the advantage that the at least one sensor of the position determining device does not need to be calibrated for exact measurements in the entire spatial region. It merely has to be designed to precisely determine the predefined position. It is a disadvantage that measurement errors of the measuring system of the CMM falsify the obtained calibration information.

In the case of the second measurement principle, a precise measurement of the relative position by means of the at least one sensor of the position determining device is necessary. This may be achieved for example by calibration of the sensor. For example, if the body connected to the rotary apparatus is a sphere or spherical cap, and the position determining device has at least two sensors which perform measurement in different determination directions, a measurement error may arise because the determination direction is not oriented perpendicular to the sphere and the surface point that is captured on the sphere is not situated at a distance of one full sphere radius from the vertical through the sphere central point. It is however advantageous that the measurement error of the measuring system of the CMM is limited to the reproducibility of the predefined position, into which the movable part with the rotary apparatus mounted thereon is to be brought, in the coordinate system of the CMM.

The two said measurement principles, and also combinations thereof, relate to a single rotary position of the rotary apparatus. As mentioned above, however, calibration information is in many cases required at various rotary positions of the rotary apparatus, or this at least leads to better results of the calibration. The abovementioned approaches are therefore preferably performed at various rotary positions of the rotary apparatus, and/or the arrangement is designed accordingly.

For the at least one sensor of the position determining device, use may be made of various types of sensors. In particular, the at least one sensor may be a sensor with a tactile probing action, that is to say the relative position of the rotary apparatus mounted on the movable part of the CMM, or of the body connected to said rotary apparatus, relative to the position determining device is determined by contact with the at least one sensor with tactile probing action of the position determining device. For example, the sensor with tactile probing action of the position determining device can, similarly to tactile probes on coordinate measuring machines, be deflected out of a rest position elastically, for example counter to a spring action, and the relative position can be determined from this. It is preferable for the movement of the sensor with tactile probing action to be implemented with air bearings, and thus with low friction. In particular if the probe is brought into a predefined position with respect to the position determining device while the sensor measures the relative position, hysteresis effects are thus minimized.

It is however preferred if the at least one sensor of the position determining device is a sensor which operates contactlessly. This has the advantage that the determination is free from forces acting on the rotary apparatus or on the body connected thereto, which forces additionally arise as a result of the position determination. If, during the normal operation of the CMM, a tactile probe is mounted on the rotary apparatus, it may on the other hand be advantageous in some cases if similar forces act on the rotary apparatus during the position determination for the purposes of the calibration as those which act during the normal operation for the determination of coordinates of a workpiece.

Even if the position is determined contactlessly, it is possible for an actuator to be provided or used for simulating the forces that act during the normal operation of the rotary apparatus. The actuator exerts a corresponding force on the rotary apparatus or on a body connected thereto. In particular, the actuator may be arranged at the location of the position determining device. One possibility consists in fastening the actuator to the same holder on which the at least one sensor of the position determining device is mounted.

In particular in the case of a passively measuring measuring head which is mounted on the rotary apparatus and on which a probe for the tactile probing of objects is mounted, different weight forces can act, owing to the inherent mass of the measuring head, in a manner dependent on the rotary position of the rotary apparatus. Said weight forces can lead in particular to a deflection of the probe out of its rest position, which does not occur as a result of probing forces between the probe and the object to be probed. By contrast, active measuring heads, that is to say measuring heads which, by means of the probe mounted thereon, can generate a probing force on the object, have the possibility of compensating the inherent weight force. Aside from the movable parts of the measuring head, the mass of one or more probes mounted on the measuring head also contributes to the inherent weight force.

In particular if the at least one sensor of the position determining device determines the position contactlessly and therefore no forces act between the position determining device and the rotary apparatus or the body connected thereto, the actions of the inherent weight force on the measuring head and optionally also on the at least one probe mounted on the measuring head can be determined. For this purpose, the rotary apparatus can be brought into different rotary positions (this also applies to combinations of rotary positions if the rotary apparatus has a multiplicity of axes of rotation), and the position can be determined in each case. Differences in relation to a position that is expected without taking the inherent weight force into account can be attributed to the inherent weight force. A determination of the effect of the inherent weight force is possible in this way.

It is particularly preferred if the at least one sensor of the position determining device is a distance sensor which performs measurement contactlessly. In particular, the distance sensor has a determination direction, which can also be referred to as measuring direction. In this determination direction, the distance to an object arranged in the spatial region of the position determining device is determined. The determination direction corresponds to a straight line in space. Aside from the direction, the position of the straight line is also of importance.

Optical contactlessly measuring sensors, in particular laser interferometers, are particularly highly suitable. Use is particularly preferably made of multi-wavelength laser interferometers, that is to say sensors which utilize laser radiation of different wavelengths. These have a particularly wide measurement range in which the distance to the object to be determined is uniquely detected. This uniqueness range can be equated to the corresponding length of the spatial region of the position determining device, that is to say the spatial region has, in the determination direction, the length of the uniqueness range of the distance measurement. Suitable multi-wavelength laser interferometers with a uniqueness range of several mm and a resolution in the range of 10 nm are commercially available. A large spatial region of the position determining device has the advantage that rotary apparatuses with different geometries can be calibrated in succession, and/or the same rotary apparatus can be calibrated in different rotary positions in a simple manner using the same position determining device.

By means of a multi-wavelength laser interferometer or some other contactlessly measuring distance sensor, the distance of the rotary apparatus arranged in the spatial region of the position determining device, or of the body arranged on the rotary apparatus, to the sensor or to some other reference point can be measured. For example, during a first calibration by means of the position determining device, the distance and thus the relative position of the rotary apparatus or of the body can be determined. Subsequently, the rotary apparatus or the body is removed from the spatial region of the position determining device, and the rotary apparatus is used for example for the normal measurement operation of the CMM. At a later point in time, the rotary apparatus or the body is moved into the spatial region of the position determining device again, and the distance or the relative position of the rotary apparatus or of the body is determined again by means of the at least one sensor. From this, in particular, the change in the relative position (with respect to the position determining device and/or in relation to the measuring system of the CMM) in relation to the first calibration is determined and is used for example for a renewed calibration of the rotary apparatus. This approach has the advantage that a systematic error or offset value in the position determination by means of the position determining device does not have an effect on the result. In particular, the at least one sensor of the position determining device remains continuously in operation between the first and the second determination of the position of the rotary apparatus or of the body. Alternatively, the operation of the at least one sensor is restarted after the first position determination, before the rotary apparatus or the body is moved into the spatial region of the position determining device again for the purposes of the second position determination.

Further possible types of distance sensors which perform measurement contactlessly are capacitive sensors or eddy current sensors. In these cases, at least that part of the rotary apparatus, or of the body arranged thereon, whose relative position with respect to the position determining device is to be determined must be electrically conductive. The part may be equipped with an electrically conductive layer on its surface, for example may have been coated with a metal by vapor deposition. Alternatively or in addition, the part or the body may for example have an electrically conductive, for example metallic core. In particular, it is possible, for the purposes of the position determination, for a body which is electrically conductive to be arranged on the rotary apparatus. The body is for example a sphere or a spherical cap. In this case, the sphere central point can be determined in a simple manner by multiple sensors of the position determining device, in particular analogously to known calibration methods which use a spherical calibration body.

Further suitable types of sensors are laser triangulation scanners or cameras, in particular digital cameras, which generate two-dimensional digital images. Alternatively, the camera may be a TOF (Time of Flight) camera which, for each image element of a matrix row or of a two-dimensional image matrix, captures distance information in relation to the object positioned in the spatial region of the position determining device.

If a part of the rotary apparatus or of the body arranged on the rotary apparatus is magnetic and has for example a permanent magnet, the at least one sensor may be a Hall sensor or a magnetoresistive sensor. Alternatively or in addition, for the purposes of coupling and decoupling sensors, which serve for determining coordinates of workpieces, to coordinate measuring machines, the rotary apparatus may have a fastening interface, for example a so-called change-over plate. In many cases, the interfaces are equipped with magnets, because the fastening force with which the sensor is held on the CMM is a magnetic force. In this case, a magnetic part of the interface can be determined with regard to its relative position by one of said magnetic sensors of the position determining device.

The position determining device preferably has at least two sensors by means of which the position of the rotary apparatus, or of the body arranged on the rotary apparatus, relative to the position determining device is determined, wherein each of the at least two sensors has a determination direction in which it determines the position of the rotary apparatus or of the body relative to the position determining device, and wherein the determination directions of the at least two sensors run perpendicular to one another in pairs. As will be discussed in more detail, the straight lines which correspond to the determination directions do not exactly intersect, but rather extend closely past one another. The arrangement with the at least two or at least three sensors, the determination directions of which run perpendicular to one another in pairs, may be referred to as a Cartesian sensor arrangement, in analogy to a Cartesian coordinate system. In the case of two such sensors, the relative position is determined with regard to two relatively mutually independent degrees of freedom of the movement, and in the case of three such sensors, said relative position is determined with regard to three mutually independent linear degrees of freedom of the movement. The arrangements may be referred to for short as 2D and 3D sensor arrangements. It is however not imperatively necessary for the determination directions of the two or three sensors to be perpendicular to one another in pairs in order to obtain two-dimensional or three-dimensional position information.

Preferably, that part of the rotary apparatus, or of the body arranged on the rotary apparatus, whose relative position with respect to the position determining device is to be measured is moved into that region of the position determining device in which the determination directions intersect, that is to say which all of the determination directions of the two-dimensional or three-dimensional sensor arrangement pass through. In the case of a spherical body, the central point of the sphere is preferably positioned at the point of intersection of the determination directions.

In particular, the position determining device has a holder which holds the at least one sensor of the position determining device. In particular, depending on the embodiment of the position determining device, the holder may hold two to five sensors. If the holder holds at least two sensors whose determination directions are not oriented toward a common intersection point but rather run for example parallel to one another and at a distance from one another, it is possible to determine not only the relative position of the rotary apparatus, or of the body arranged on the rotary apparatus, relative to the position determining device but also the orientation of the rotary apparatus or of the body. For example, the determination directions of different sensors may be oriented toward different longitudinal sections of a cylindrical part of the rotary apparatus or of the body, and the orientation and relative position of the cylindrical part can be determined. In order to be able to measure the orientation transversely with respect to a longitudinal axis of the cylindrical part in two directions, four sensors are used, of which for example in each case two have determination directions which are oriented toward the same part of the cylindrical part. For example, the determination directions of the sensors which are oriented toward the same part of the cylindrical part and thus toward the same target area in the spatial region of the position determining device run perpendicular to one another. A further, fifth sensor may be oriented with its determination direction in said longitudinal direction of the cylindrical part, wherein the determination direction of said sensor is oriented in particular toward the intersection points of the determination directions of the two sensor pairs which are oriented in each case toward a common part of the cylindrical part or toward the same target area.

In particular, the holder may be fixedly connected to the base of the CMM. Alternatively, as already mentioned, the holder may be connected to the base by means of a movement device, such that the movement position of the holder and thus of the sensors of the position determining device relative to the base is adjustable. For example in the case of the abovementioned four or five sensors, an axis of rotation of the rotary apparatus may coincide with the stated longitudinal axis, that is to say the in each case two pairs of sensors whose determination directions are oriented toward the same target area can be rotated about the axis of rotation. In particular, this arrangement makes it possible for the rotary apparatus, or the body arranged thereon, to be moved in unimpeded fashion into the spatial region of the position determining device in the case of different rotary positions of the rotary apparatus.

As mentioned above, the rotary apparatus may have not just one axis of rotation but multiple axes of rotation (for example two axes of rotation as in the case of a rotary/pivot joint). In particular, the axes of rotation are, in kinematic terms, arranged in series, that is to say the second part of the rotary apparatus is rotatable relative to the first part about a first axis of rotation of the rotary apparatus, and a third part of the rotary apparatus is rotatable relative to the second part about a second axis of rotation of the rotary apparatus. In the case of two axes of rotation which are kinematically in series, the sensor of the CMM is connected to the third part such that the rotary position thereof with respect to the second axis of rotation is determined uniquely by the rotary position of the third part. If, in the case of a rotary apparatus of said type, the body connected to the second part is moved into the spatial region of the position determining device in order to obtain the calibration information, then in the case of two axes of rotation arranged kinematically in series with respect to one another, the body is preferably connected to the third part, and the rotary position of said body with respect to the second axis of rotation is determined uniquely by the rotary position of the third part with respect to the second axis of rotation. In the case of more than two axes of rotation arranged kinematically in series with respect to one another, the body is preferably connected to that part of the rotary apparatus which is rotatable by means of a rotation about the final one of the axes of rotation arranged in series with respect to one another. In the case of two axes of rotation arranged in series with respect to one another, the final axis of rotation is the second axis of rotation. In the case of three axes of rotation arranged in series with respect to one another, the final axis of rotation is the third axis of rotation.

In the case of axes of rotation arranged in series with respect to one another, the sensor is normally fastened either directly or indirectly to that part which is movable in rotation by means of the rotation of the final axis of rotation. The rotary position of said sensor is normally determined by the rotary position of that part of the rotary apparatus which is rotationally movable about the final axis of rotation. The body which is arranged in the spatial region of the position determining device in order to obtain the calibration information is preferably connected to the same part of the rotary apparatus (specifically not indirectly via an axis of rotation of the rotary apparatus) as the sensor of the CMM or as an interface for the fastening of the sensor. For example, the body may be fastened to the interface for the fastening of the sensor when the sensor is not fastened to the interface. This applies not only to the case of a rotary apparatus with multiple axes of rotation but also to a rotary apparatus having a single axis of rotation. In this case, the interface for the fastening of the sensor is connected to the second part, and the rotary position of the interface is uniquely defined by the rotary position of the second part. Alternatively, the body may be connected to the rotary apparatus at the same time as the sensor, for example to the second part of the rotary apparatus in the case of a rotary apparatus with a single axis of rotation or to the final part of the rotary apparatus in the case of a rotary apparatus with multiple axes of rotation which are kinematically in series. If the body is connected to the final part of the rotary apparatus (the second part of the rotary apparatus in the case of a rotary apparatus with a single axis) and the rotary position of said body with respect to the final axis of rotation is uniquely defined by the rotary position of the final part, the entire rotary apparatus can be calibrated in a simple manner by virtue of the body being positioned in the spatial region of the position determining device and the calibration information being obtained in said state. A corresponding situation applies if not a body connected to the final part (for example the sensor or some other body) but the final part of the rotary apparatus itself is positioned in the spatial region of the position determining device and the calibration information is obtained in said state. In the case of at least two axes of rotation of the rotary apparatus arranged in series with respect to one another, this has the advantage that the rotary apparatus can be calibrated in a simple manner with respect to all axes of rotation. It is however not ruled out that, in the case of multiple axes of rotation arranged kinematically in series with respect to one another, the body may be connected not to the final part but rather to a part of the rotary apparatus which is rotationally movable relative to the first part only about some of the axes of rotation, or alternatively, instead of the body, said part which is arranged between the first part and the final part of the rotary apparatus and which is rotationally movable relative to the first part only about some of the axes of rotation may be arranged in the spatial region of the position determining device, and the calibration information may be obtained in said state.

In particular, it is also possible, using the position determining device, to calibrate not only the rotary apparatus but also a sensor (for example a tactile probe) arranged on the rotary apparatus, wherein the sensor is connected rotationally movably to the first part of the rotary apparatus via at least one axis of rotation of the rotary apparatus. In particular, the sensor may be connected to the final part of the rotary apparatus, and the rotary position thereof with respect to the final axis of rotation of the rotary apparatus can be uniquely determined by the rotary position of the final part with respect to the final axis of rotation of the rotary apparatus.

In particular, calibration information for the calibration both of the rotary apparatus and of the sensor can be obtained simultaneously by virtue of the sensor, or a body connected thereto, being brought into the spatial region of the position determining device and the position of the sensor, or of the body connected thereto, being determined. This therefore provides common calibration information, because the position of the sensor or of the body connected thereto is dependent both on the position and geometry of the rotary apparatus and on the position and geometry of the sensor. If the body which is connected to the sensor is used, this applies at any rate if the body is connected to the rotary apparatus via at least a partial section of the sensor, and therefore at least said partial section of said sensor co-determines the position of the body.

The rotary apparatus, or the body connected thereto, can be moved into the spatial region of the position determining device and remain stationary while the at least one sensor determines the relative position. It is however also possible for the probe or the part of the probe to be moved continuously while the at least one sensor determines the relative position. The continuous movement may, in accordance with one of the measurement principles already described, be a spiral-shaped movement, for example. It is however also possible for the probe or the part of the probe to be moved continuously past the at least one sensor and in particular to enter the spatial region at one side and to exit the spatial region again at an opposite side.

It is advantageous if the determination of the relative position is performed repeatedly under unchanged boundary conditions (in particular temperature conditions) of the operation of the CMM. This makes it possible in particular for random errors in the position determination to be eliminated, for example by averaging of the position values of the individual measurements.

The holder is preferably composed of a material which has a low coefficient of thermal expansion. Examples are metal alloys such as for example the alloy with the material number 1.3912 of the Steel Institute VDEh, or fiber-reinforced plastics whose fiber longitudinal directions follow helical paths. Alternatively or in addition, the influence of temperature fluctuations and temperature gradients on the position determining device and in particular on the holder thereof may be corrected by computation if corresponding information regarding the temperature is collected. For example, in a simple case, the temperature of the holder and optionally also the temperature of the surroundings of the holder can be measured.

It is preferably sought for the holder positioned on the base to have as small a height as possible. In this way, the holder does not constitute an obstruction for most movements during the measurement operation of the CMM. On the other hand, it is advantageous if in particular a sensor of the position determining device, the determination direction of which sensor runs horizontally, is positioned at a height level above the base on which the rotary apparatus is also situated during the operation of the CMM.

In particular, the position determining device (for example the holder) may have at least one region which is utilized for determining the position and/or orientation of the position determining device in the operating region of the CMM. Said region may be designed as a characteristic region or as an artefact. This may for example be a corner region of the holder or a cutout or deformed portion (for example a depression) of the holder. The at least one region may be scanned by means of a sensor arranged on the movable part of the CMM, for example may be probed by means of a tactile probe, specifically preferably at multiple surface points, and the position and/or orientation of the position determining device can be determined in this way. In particular using additional information regarding the geometry of the position determining device, the rotary apparatus or the body connected thereto can then be moved into the spatial region of the position determining device in order to determine the relative position with respect to the position determining device. The position of the characteristic region or of the artefact may also be determined repeatedly by scanning by means of the sensor in order to determine effects of thermal drift. Another way of determining the thermal drift using the sensors of the position determining device will be described below.

Alternatively or in addition, in order to determine the position and/or orientation of the position determining device in the operating region of the CMM, the rotary apparatus, or the body connected thereto, may be moved into the spatial region of the position determining device. The fact that the rotary apparatus, or the body connected thereto, has reached the spatial region is detected in particular by virtue of the at least one sensor determining the relative position of the rotary apparatus or of the body connected thereto. In the case of a multiplicity of sensors whose determination directions intersect one another, the position of the position determining device can be determined, and in the case of various regions in which determination directions of sensors intersect, the orientation of the position determining device can also be determined, by virtue of the probe being moved into the region of the intersection point or into the regions of the intersection points and the sensors generating corresponding determination signals. In particular, the rotary apparatus or the body connected thereto (for example a sphere) is situated exactly at the intersection point of determination directions if the sensors assigned to the intersection point all measure the smallest possible (at least approximately) equal distance. Later, in order to calibrate the rotary apparatus, the rotary apparatus, or the body connected thereto, can be moved again to the position and/or orientation of the position determining device thus found.

In summary, the following advantages can be mentioned: in particular, the position of a body, which is a sphere or spherical cap, can be determined with high accuracy by means of the position determining device. If the relative position of the rotary apparatus, or of the body connected thereto, is measured contactlessly, the rotary apparatus is not acted on by any forces that can falsify the measurement. It is then also the case that no undesired deformation occurs, and no hysteresis effects arise. Also, no friction is generated between the sensor of the position determining device and the rotary apparatus or the body connected thereto. Owing to the fact that, for any rotary position or combination of rotary positions, only one relative position of the rotary apparatus or of the body connected thereto has to be determined by the position determining device, the method can be carried out very quickly in relation to the calibration by probing of multiple points of a calibration object. Also known are classic methods in which three pairs of cylinder surfaces oriented parallel to one another are used, wherein simultaneous contact is established with in each case both cylinder surfaces of the same pair. Here, it is however possible for undesired errors to arise as a result of friction or deformation. In the case of the method according to the invention, the relative position and optionally the orientation of the rotary apparatus, or of the body connected thereto, with respect to the desired degrees of freedom of the movement can be determined in a simple manner. It is merely necessary for the corresponding number of sensors to be provided as part of the position determining device, and the sensors merely have to be oriented correspondingly to the degrees of freedom of the movement which are to be determined. The method is particularly highly suitable if the position of a body of spherical shape is to be determined. In particular in the case of a Tool Center Point (TCP) movement, the movement paths are shortened in relation to a calibration by probing of a calibration body at various surface points.

In particular, a probe which is arranged via the rotary apparatus on the movable part of the CMM is, after its relative position in the spatial region of the position determining device has been determined and it has been calibrated together with the rotary apparatus, used to probe a workpiece and thereby determine coordinates of the workpiece. The calibration is preferably repeated using the position determining device after the probing of the workpiece.

The invention is not limited to the use of a single position determining device. For example, multiple such position determining devices may be arranged at various locations in the movement range of the probe. If the relative position of the rotary apparatus with respect to the respective position determining device is determined at least once by means of each of the position determining devices, it is possible in particular for systematic errors of the CMM, for example movement errors, to be determined. The movement errors may for example be perpendicularity errors, that is to say deviations of movement axes of the CMM from an ideally mutually perpendicularly running configuration.

The calibration and also the operation of the rotary apparatus can be influenced to a significant extent by weight forces of apparatuses mounted on the rotary apparatus, in particular a measuring head which is mounted on the final part of the rotary apparatus and on which, in turn, there is mounted for example a sensor such as a tactile probe. The weight force of a measuring head is however generally significantly greater than that of the probe. For various reasons, it may be desirable to calibrate the rotary apparatus without a measuring head mounted thereon. For example, the measuring head may be required for use on another CMM. To calibrate the rotary apparatus as far as possible under the same conditions as those during the use of the measuring head, it is thus possible for another object (a substitute object) instead of the measuring head to be arranged on the rotary apparatus, which object has the same mass as the measuring head. If different measuring heads can be operated on the rotary apparatus, the calibration can be performed successively with different substitute objects of the same mass. For example, it is furthermore possible for a body to be mounted on the respective substitute object and thus fastened to the rotary apparatus, which body is, for the purposes of obtaining the calibration information, brought in each case into the spatial region of the position determining device. The body may for example have the shape of a sphere or of a spherical cap.

BRIEF DESCRIPTION OF THE DRAWINGS

Exemplary embodiments of the invention will now be described with reference to the attached drawing. In the individual figures of the drawing.

DETAILED DESCRIPTION OF THE PREFERRED EMBODIMENTS

Figure 1:
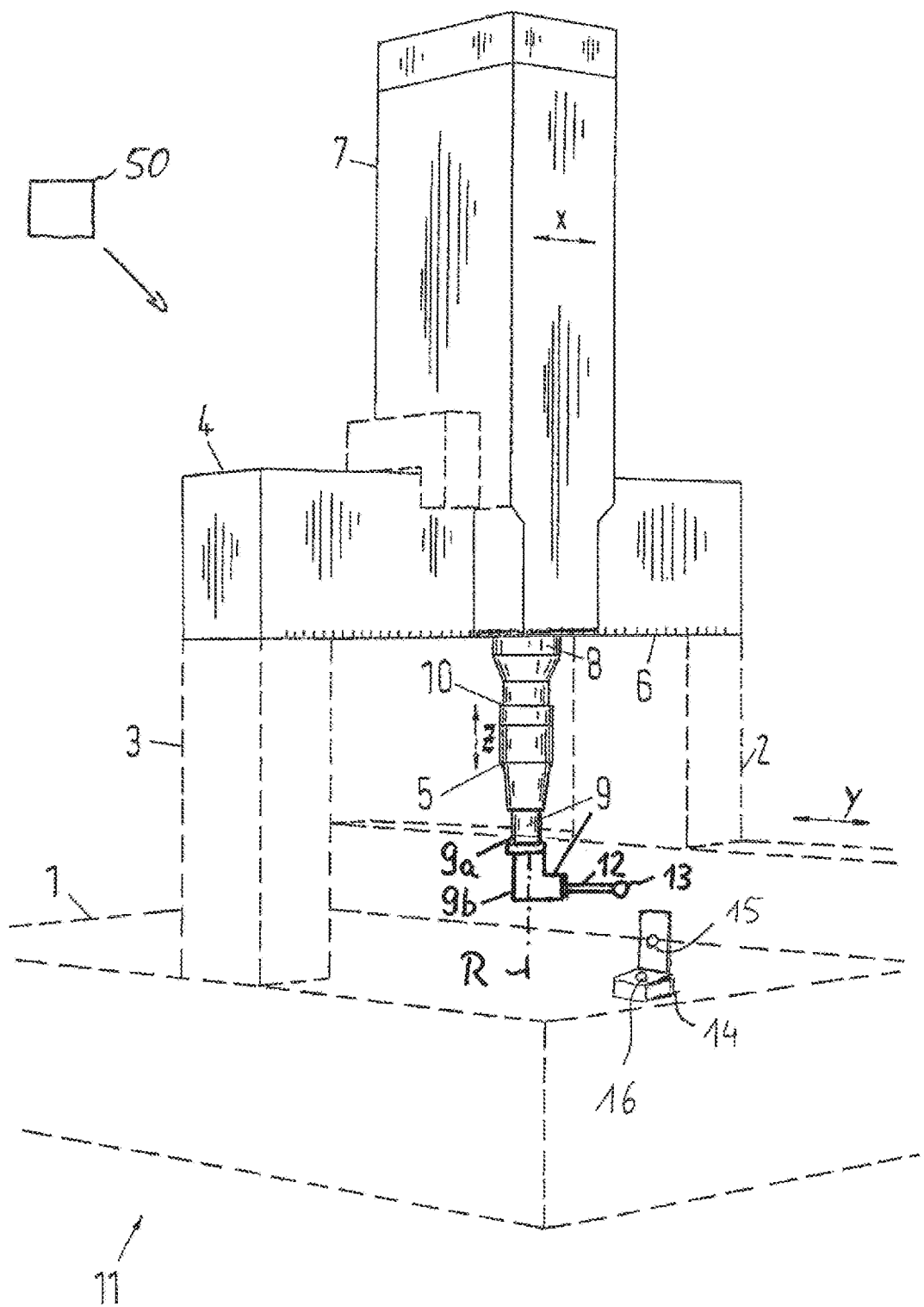
FIG. 1 shows a coordinate measuring machine with a portal design.

The coordinate measuring machine (CMM) 11 with a portal design, depicted in FIG. 1, comprises a base 1 designed as a measurement table, above which columns 2, 3 are arranged in a manner movable in the Y direction of a Cartesian coordinate system with the coordinate axes X-Y-Z. Together with a crossbeam 4, the columns 2, 3 form a portal of the CMM 11. At its opposite ends, the crossbeam 4 is connected to the columns 2 and 3, respectively. Electric motors not depicted in any more detail cause the linear movement of the columns 2, 3 in the Y direction. Here, for example, one electric motor is associated with each one of the two columns 2, 3.

The crossbeam 4 is combined with a cross slide 7, which is movable, by way of air bearings, along the crossbeam 4 in the X direction of the Cartesian coordinate system. The current position of the cross slide 7 relative to the crossbeam 4 can be determined on the basis of a scale graduation 6. The movement of the crossbeam 4 in the X direction is driven by a further electric motor.

A quill 8, which is movable in the vertical direction, is mounted on the cross slide 7 and is connected at the lower end thereof via a mounting device 5, 10 to a rotary apparatus 9. A probe pin 12 is arranged in exchangeable fashion on the rotary apparatus 9, which probe pin has, on its free end, a probe sphere 13 as a probe element for the tactile probing of objects. The rotary apparatus 9 has a first part 9a and a second part 9b, which are rotatable relative to one another about an axis of rotation R of the rotary apparatus 9. In particular, in the transition region of the second part 9b to the probe pin 12 there may be arranged a measuring head (not illustrated in any more detail) which measures a deflection of the probe pin 12 out of its rest position. The quill 8 can be moved relative to the cross slide 7 in the Z direction of the Cartesian coordinate system in a manner driven by a further electric motor. By means of the total of four electric motors in the exemplary embodiment, the probe pin 12 can thus be moved to any point underneath the crossbeam 4 and above the base 1 which lies in the intermediate space defined by the columns 2, 3.

Furthermore, the rotary apparatus 9 exhibits the said rotary mobility about the axis of rotation R. Therefore, it is possible not only for the position of the probe sphere 13 to be positioned by rectilinear movement in the directions X, Y, Z, but also for the orientation of the longitudinal axis of the probe pin shank 12 to be adjusted. In the exemplary embodiment illustrated, the axis of rotation R runs in the Z direction, and the longitudinal axis of the probe pin shank 12 runs in the X-Y plane. Other configurations are however possible. For example, the axis of rotation of the rotary apparatus may be oriented differently. Alternatively or in addition, the longitudinal axis of the probe pin may be oriented differently. It is furthermore alternatively or additionally possible for the rotary apparatus to have two or more axes of rotation, which are in particular arranged kinematically in series with respect to one another. In one exemplary embodiment, the first axis of rotation may run in the Z direction of the coordinate measuring machine illustrated in FIG. 1, and the second axis of rotation may run in the X-Y plane. For example, in this case, a probe pin is arranged on the rotary apparatus such that its probe pin longitudinal axis does not run in the direction of the second axis of rotation. This makes it possible for the probe pin longitudinal axis to be oriented differently by rotation about the first and second axes of rotation.

The CMM 11 has a measuring system (not illustrated in more detail in FIG. 1) for the purposes of measuring the present movement position of the columns 2, 3 in the Y direction, of the cross slide 7 in the X direction, and of the quill 8 in the Z direction. Of the measuring system, only the scale graduation 6 is illustrated, which extends along the crossbeam in the X direction. For example, in the cross slide 7, there is arranged at least one reading head which interacts with the scale graduation and permits the determination of the position of the cross slide 7 in the X direction. Corresponding scale graduations and reading heads may also be provided for determining the position of the columns 2, 3 in the Y direction and for determining the position of the quill 8 relative to the cross slide 7 in the Z direction.

This is merely one example of a CMM which has a movable part on which a rotary apparatus is arranged. Other examples are CMMs with a gantry design, and CMMs with a movable measuring table. In this case, it is duly the case that only the measuring table is actively moved. This however likewise leads to a relative movement of the probe with respect to the measuring table, with respect to a workpiece to be measured arranged on said measuring table, and with respect to a position determining device arranged on said workpiece.

For example, by calibration of the probe pin 12 on a calibration sphere (not illustrated in FIG. 1), the position of the central point of the probe sphere 13 relative to the quill 8 can be determined. During the calibration, the rotary apparatus can be brought into different rotary positions, whereby the orientation of the probe pin 12 changes. Another possibility consists in calibrating the probe pin without the use of the rotary apparatus. For example, the rotary apparatus may be decoupled from the quill and, instead, the probe pin may be coupled directly to the quill. Alternatively or in addition, previously known information regarding the dimensions of the parts arranged on the quill 8 (including the rotary apparatus) may be utilized in order to determine the central point of the probe sphere 13 relative to the quill 8.

The determination of the position of the central point of the probe sphere 13 relative to the quill however constitutes only one possible type of calibration of the probe 12. Alternatives consist for example in determining, by means of calibration, the position of some other point of the probe 12 (for example a particular surface point on the probe sphere 13). Furthermore, the calibration may be performed merely for the purposes of checking and possibly correcting existing previous information regarding the geometry, the position and/or orientation of the probe. The previous information may in particular also include the result of an earlier calibration. Furthermore, the position of the central point of the probe sphere or the position of some other particular point of the probe does not need to be determined with respect to the quill, but rather may be determined for example with respect to a particular point on the base (for example the origin of the coordinate system of the CMM).

A rectangle in FIG. 1 schematically illustrates a controller 50 of the CMM 11 which controls the operation of the CMM 11 and which in particular controls the movement of the movable part (in this case for example of the quill 8) on which the rotary apparatus 9 is mounted. The controller (for example a computing unit with data processor) may also perform the function of the calibration device, which, from the information obtained from the position determining device 14 and from the measuring system of the CMM 11, calibrates the rotary apparatus 9 and optionally also the probe for the further operation.

A position determining device 14 is arranged on the base 1 in the vicinity of that edge of the base 1 which is illustrated on the right in FIG. 1. In the exemplary embodiment illustrated, the position determining device 14 has two sensors 15, 16 by means of which the relative position of the probe 12 mounted on the rotary apparatus 9, or of some other body arranged on the rotary apparatus 9, or of a part of the rotary apparatus directly, relative to the position determining device 14 can be determined. For example, a body may be mounted directly on the second part of a rotary apparatus with a single axis of rotation, either instead of the probe/sensor or in addition to the probe/sensor. Below, a description will be given of the obtainment of calibration information for the calibration of the rotary apparatus 9, wherein the probe 12 is arranged on the rotary apparatus 9 and the probe sphere 13 of the probe 12 is brought into the spatial region of the position determining device 14. Alternatively, as mentioned above, a part of the rotary apparatus, or some other body connected to the rotary apparatus, may be brought into the spatial region for the purposes of obtaining the calibration information.

The first sensor 15, which is arranged in a laterally upwardly projecting part of the position determining device 14, is for example designed such that it can measure the distance in the X direction to a part arranged in the vicinity thereof, and thus to the probe sphere 13, when the probe sphere 13 is situated in the spatial region adjacent to the first sensor 15 and above the second sensor 16, which is integrated into a pedestal of the position determining device 14. The second sensor 16 is designed to determine the distance to a part arranged thereabove in the Z direction.

Another position determining device may have a third sensor (for example in a further laterally upwardly projecting part) in addition to the first sensor 15 and the second sensor 16, which third sensor is designed to measure the distance in the Y direction to a part arranged in the vicinity of said third sensor. Here, the determination directions of the three sensors (and, in the case of the position determining device 14, of the two sensors 15, 16) intersect as close as possible to a common point. In practice, it is however generally the case that no common intersection point is realized. Rather, the determination directions of the various sensors run past one another with as small a spacing as possible, as is the case with skewed straight lines. It is therefore preferable for the determination direction of the individual sensors to be determined by calibration. For example, a calibration body in the form of a sphere or a spherical cap can be moved transversely with respect to the determination direction, and the position of the calibration body in which the distance to the sensor whose determination direction is to be calibrated is at a minimum can be determined. In this position, the determination direction runs perpendicular to the surface of the sphere or of the spherical cap. For example, a measuring system which is utilized for the calibration, and which does not utilize the sensor or the sensors of the position determining device, outputs the position of the calibration body and therefore, together with the determination result of the sensor, the location of the determination direction of the sensor. As soon as the determination direction for each of the sensors has been determined, it is for example also possible to determine how precisely the determination directions intersect at one point, or how large the remaining distances between the corresponding straight lines in space are. Alternatively or in addition to the calibration, the determination directions of the sensors may be adjusted such that they intersect at a common intersection point or run as closely as possible past a common point.

Figure 2:
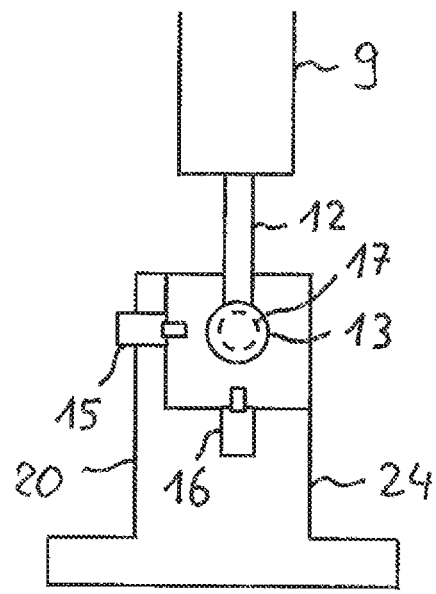
FIG. 2 schematically shows a side view of a position determining device with three sensors, the determination directions of which are oriented correspondingly to the coordinate axes of a Cartesian coordinate system, wherein the probe sphere of a probe pin is situated approximately at the intersection point of the three determination directions.

The position determining device illustrated in FIG. 2 constitutes, for example, a modification of the position determining device 14 from FIG. 1, which has three sensors for determining the relative position of a rotary apparatus or of a body connected thereto (in particular of a probe sphere). A holder 20 holds the three sensors 15, 16, 17 such that the determination directions thereof run in substantially invariable fashion in space. A first sensor 15 is held in a laterally upwardly projecting part of the holder 20, such that the determination direction of said first sensor extends horizontally from right to left in the plane of the drawing. A second sensor 16 is held by the holder 20 at a lower position. The determination direction of said second sensor runs in the vertical direction in the plane of the drawing. A third sensor 17 is indicated in FIG. 2 merely by a dashed circle. Said third sensor is held by a region of the holder 20 which projects upwardly behind the probe sphere 13 of the illustrated probe pin 12. The determination direction of said third sensor extends perpendicular to the plane of the figure. The three determination directions of the sensors 15, 16, 17 intersect approximately at a common point, which can be viewed as an intersection point of the three Cartesian coordinate axes corresponding to the determination directions.

FIG. 2 schematically illustrates a rotary apparatus 9 of a coordinate measuring machine, on which rotary apparatus a probe pin 12 (for example the probe pin 12 from FIG. 1) is arranged. In the example illustrated, the longitudinal axis of the probe pin shank runs in a vertical direction. In particular if the rotary apparatus 9 has at least two axes of rotation, the longitudinal axis of the probe pin shank can be oriented in virtually any desired directions depending on the rotary position of the rotary apparatus. The probe sphere 13 could therefore, for example in the illustration of FIG. 2, be held by the probe pin shank, which runs from the right or from the front to the spatial region of the position determining device.

Figure 3:
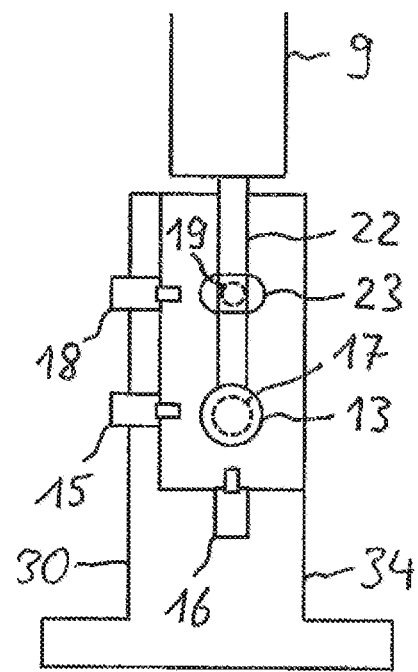
FIG. 3 shows an arrangement similar to that in FIG. 2, wherein the position determining device however has two additional sensors, the determination directions of which intersect in the manner of coordinate axes of a two-dimensional Cartesian coordinate system, wherein the determination directions of the two additional sensors run parallel over the determination directions of two of the three other sensors, FIG. 4 schematically shows a side view of a base of a CMM on which the position determining device from FIG. 2 and a calibration sphere are arranged.

This basically also applies correspondingly to the variant of a position determining device 34 illustrated in FIG. 3, which is however also suitable for determining the orientation of the probe or of some other body which is arranged in the spatial region of said position determining device. If the rotary apparatus is situated in rotary positions other than that illustrated in FIG. 3, it is also possible, in an optional embodiment of the arrangement, for the position determining device 34 to be rotated by a further rotary apparatus (not illustrated in FIG. 3) such that a determination of the orientation is possible.

The position determining device 34 has five sensors 15, 16, 17, 18, 19 for determining the relative position of a rotary apparatus, of a probe, or of some other body arranged on the rotary apparatus, relative to the position determining device 34. In the lower region of the illustration, the position determining device 34 is identical to the position determining device 24 illustrated in FIG. 2. The upwardly projecting parts of the holder 30 however extend further upward than in the case of FIG. 2. Above the first sensor 15, a fourth sensor 18 is held in the laterally upwardly projecting part of the holder 30, the determination direction of which fourth sensor extends parallel to and vertically above the determination direction of the first sensor 15. In that part of the holder 30 which projects upwardly behind the probe pin 22, a fifth sensor 19 is arranged above the third sensor 17, wherein the determination direction of the fifth sensor 19 extends parallel to and vertically above the determination direction of the third sensor 17. The determination directions of the fourth sensor 18 and of the fifth sensor 19 intersect one another at an intersection point which is situated vertically above the intersection point of the determination directions of the first sensor 15 and of the third sensor 17.

While the first sensor 15, the second sensor 16 and the third sensor 17 are used for determining a first part of a body with regard to its relative position with respect to the individual sensors 15, 16, 17 (in the exemplary embodiment, the first part is the probe sphere 13 of the probe pin 22), the fourth sensor 18 and the fifth sensor 19 are used for determining a second part of the same body with regard to its relative position with respect to the sensors 18, 19. In the exemplary embodiment, the illustrated probe pin 22 has, at the intersection point of the determination directions of the fourth sensor 18 and of the fifth sensor 19, a ring-shaped bead 23 with a cross-sectional area which is semicircular in cross section and which runs around the shank of the probe pin 22 at the outside. The illustrated probe pin 22 is in turn held by the probe pin holder 9 of the CMM.

The position determining device 34 therefore makes it possible to determine not only the relative position of the probe but also the orientation thereof in space. Furthermore, a change in length of the probe pin shank relative to an earlier measurement can be independently determined by the position determining device 34. For this purpose, it is for example the case that the position of the central point of the probe pin 13 and the central point of the ring-shaped bead 23 are determined. For this purpose, the probe pin 22 can be moved in a vertical direction, such that, for example, firstly the probe sphere central point is positioned at the intersection point of the first, second and third sensors 15, 16, 17, and subsequently the central point of the ring-shaped bead 23 is positioned at the intersection point of the determination directions of the fourth and fifth sensors 18, 19. Alternatively, the probe sphere central point may be arranged merely approximately at the intersection point of the determination directions of the lower three sensors 15, 16, 17, and at the same time the central point of the ring-shaped bead 23 may be arranged merely approximately at the intersection point of the upper two sensors 18, 19. In this case, it is to be expected that the determination directions of the sensors will not run exactly perpendicular to the respective spherical surface of the probe sphere 13 or of the ring-shaped bead 23. For the determination of the positions of the central points, use may optionally be made of prior knowledge regarding the geometry of the probe pin.

Using the position determining device, the thermal drift of a CMM can be determined, and the effects of the thermal drift can be corrected and in particular compensated, easily and in a short time. The thermal drift is to be understood to mean the change in the geometry of the CMM that can be attributed to temperature changes. For example, the thermal drift can be specified for each point of the CMM by virtue of the change in the position of the point in a positionally fixed coordinate system being specified. In particular, it is possible for the origin of said coordinate system to be placed at one location of the position determining device, for example the intersection point of three sensors, the determination directions of which intersect one another substantially exactly at a common intersection point.

Figure 4:
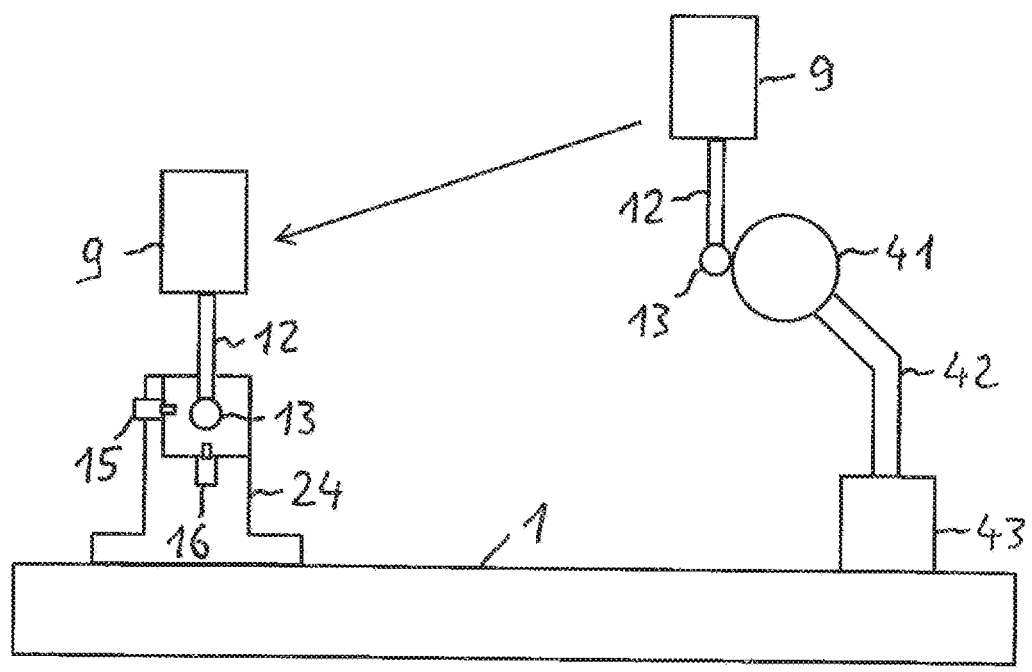

An exemplary embodiment of a method and an arrangement for determining the thermal drift will now be described on the basis of FIG. 4. FIG. 4 shows, on the base 1, a position determining device 24, in particular the position determining device 24 from FIG. 2, and a calibration sphere 41, which is held on a holder with pedestal 43 and arm 42. Of the CMM, only the rotary apparatus 9, with the probe pin 12 held thereby, is illustrated at two different locations; specifically at a first location, at which the probe sphere 13 of the probe pin 12 probes the surface of the calibration sphere 41, and at a second location, at which the probe sphere 13 is situated in the spatial region (measurement region) of the position determining device 24. Depending on the rotary position of the rotary apparatus 9, the longitudinal axis of the probe pin shank may also be oriented differently than illustrated in FIG. 4.

For example, during the warm-up phase after the switching-on of the CMM, it is in particular the case that, in different rotary positions in the rotary apparatus 9 (and thus in particular in different orientations of the probe pin shank), the probe pin 12 is used to probe a multiplicity of surface points of the calibration sphere 41, and in particular the position of the central point of the calibration sphere 41 is determined from the probing results, and also, the probe pin is brought, in particular with its probe sphere 13, into the spatial region of the position determining device 24. In particular, the rotary apparatus 9 (and optionally also the probe pin 12) is calibrated with high accuracy in a manner known per se from the measurement result of the probing of the calibration sphere 41, and a determination of the relative position, or the multiple determination of the relative position of the probe 12, using the position determining device 24 forms a reference for the following determination of the thermal drift during the further warm-up phase of the CMM or during operation of the CMM. If it is sought to determine the effects of the thermal drift over the further course of time, the probe 12 is again brought, in particular with its probe sphere 13, into the spatial region of the position determining device 24, and the relative position of the probe 12 with respect to the position determining device 24 is determined. In particular at the same rotary position of the rotary apparatus, changes in the relative position and/or in the position of the probe 12 obtained by means of the measurement system of the CMM are set in relation to the measurement results of the mentioned reference. If for example the position of the probe sphere central point has changed relative to the reference by 0.5 µm, this change can be regarded as being the result of the thermal drift, and a corresponding correction may for example be performed during the operation of the CMM. Alternatively or in addition, it is possible in particular for the change owing to the thermal drift to be detected in the stated manner multiple times in the warm-up phase of the CMM, and for the operation of the CMM to be enabled only when the thermal drift leads to no further considerable changes in the position of the rotary apparatus. For example, a limit value for the change in position of the probe or of the rotary apparatus owing to the thermal drift per time interval may be predefined. If said limit value is undershot, the operation of the CMM can be enabled. Alternatively or in addition, the change in position or some other variable determined using the position determining device may firstly be determined multiple times as a mathematical function of the time, and then the further course of said mathematical function may be extrapolated into the future. From this, too, it can be determined when sufficiently constant operating conditions for accurate measurement operation of the CMM can be expected. For example, the stated predefined limit value may be taken into account in this determination too.

It is furthermore alternatively or additionally possible, if a thermal drift determined using the position determining device satisfies a predefined criterion (for example if a predefined limit value of the change in position of the probe per time interval is exceeded), for a calibration of the rotary apparatus by means other than the use of the position determining device alone (for example by renewed probing of multiple surface points of the calibration sphere 41) to be triggered. In one variant of this approach, the frequency of the repetition of the calibration of the rotary apparatus by means other than the use of the position determining device alone is defined in a manner dependent on the result of the position determination by means of the position determining device.

Conversely, the occurrence of predefined events may trigger a position determination of the rotary apparatus using the position determining device. For example, such a predefined event may consist in at least one measurement variable from the monitoring of the surroundings of the CMM having changed in a predefined manner. For example, the temperature of the surroundings of the CMM are monitored, and the event consists in the temperature having changed to a predefined extent relative to an earlier point in time. Alternatively or in addition, the ambient temperature is measured at multiple points, and the event consists in a temperature difference greater than a predefined limit value being determined between the different temperature measurement positions. A further possible event consists in an inadvertent collision of the rotary apparatus or of the probe with an object in the movement range of the probe having occurred.

Figure 5:
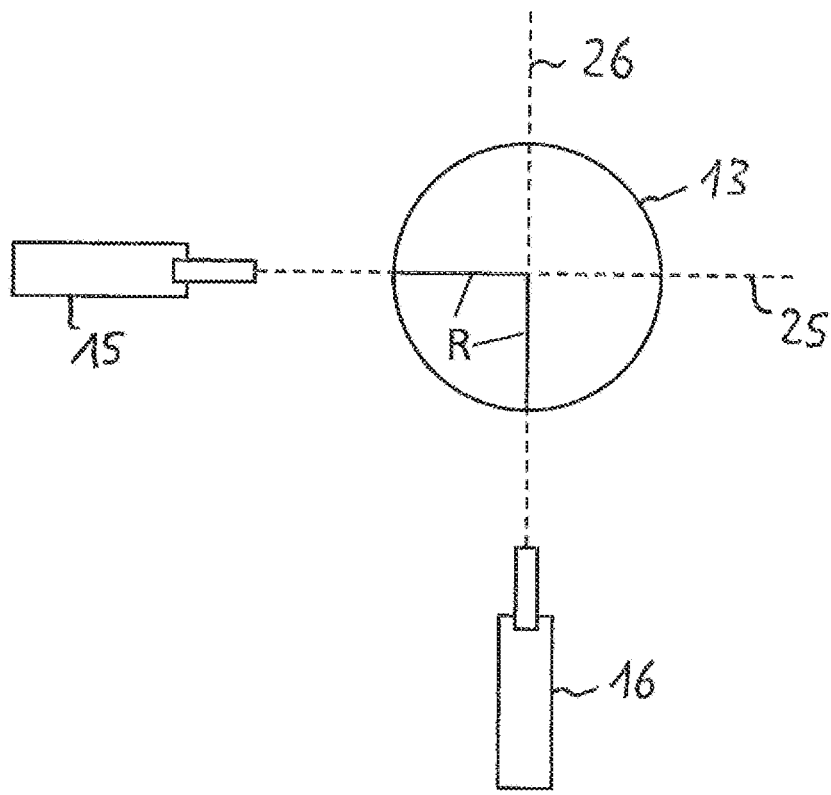
FIG. 5 shows two sensors of a position determining device, the determination directions of which intersect one another in the manner of coordinate axes of a two-dimensional Cartesian coordinate system, and a probe sphere, the radius of which is determined by the sensors, FIG. 6 schematically shows an arrangement similar to that in FIG. 2, wherein, however, there is arranged on the rotary apparatus a probe whose shank longitudinal axis on the probe element does not coincide with the axis of rotation of the rotary apparatus, and FIG. 7 schematically shows an arrangement similar to that in FIG. 2, wherein, however, there is arranged on the rotary apparatus a probe whose shank longitudinal axis is angled, such that the section of the probe pin shank on the probe sphere runs transversely with respect to the axis of rotation of the rotary apparatus, and wherein there is arranged on the second part of the rotary apparatus, which is rotatable relative to the first of the rotary apparatus about the axis of rotation of the rotary apparatus, a body which is positioned in the spatial region of the position determining device, and furthermore, there is arranged on the second part of the rotary apparatus a measuring head by means of which the probe pin is connected to the second part.

A variable which is important for the calibration of a probe with a probe sphere as probe element is the probe sphere radius. This correspondingly applies to a spherical body which is connected to the rotary apparatus and which is to be brought into the spatial region of the position determining device for the purposes of obtaining calibration information. In particular, with at least two sensors of the position determining device with determination directions corresponding to a Cartesian coordinate system (preferably with three such sensors), the sphere radius can be determined in a simple manner and in a short time, as discussed in more detail on the basis of the example of FIG. 5. The exemplary embodiment of FIG. 5 shows the case of only two sensors 15, 16 of the same position determining device. Alternatively, a third sensor could be part of the position determining device, wherein the determination direction thereof runs perpendicular to the determination directions of the two other sensors 15, 16 and intersects the latter determination directions substantially exactly at the intersection point thereof.

The determination direction 25 of the first sensor 15 and the determination direction 26 of the second sensor 16 are illustrated in FIG. 5 by dashed lines. In the illustrated state, they intersect at the central point of the probe sphere 13. Furthermore, the probe sphere radius R is illustrated in each case along the two determination directions 25, 26. To reach the illustrated relative position of the probe sphere 13 with respect to the sensors 15, 16, the probe sphere 13 can be moved by the CMM (not illustrated in FIG. 5) until the position is reached. In particular, a movement can be performed along a spiral path, or the probe sphere can be moved transversely with respect to only one of the determination directions 25, 26 until the determination direction passes through the probe sphere central point, and thereafter the same approach can be followed for the further determination direction or the further determination directions.

When the illustrated relative position has been reached, the distance determined by the respective sensor 15, 16 to the surface of the probe sphere 13 is a measure for the probe sphere radius R. Since the intersection point of the determination directions 25, 26 is known and the probe sphere 13 is situated with its central point at the intersection point, it is necessary in each case to subtract the measurement value of the distance to the sphere surface from the known distance of the probe sphere central point in order to obtain the probe sphere radius R. Since the probe sphere radius is not constant in the case of real probe spheres (that is to say the sphere is not an ideal sphere), the measurement values of the individual sensors 15, 16 can yield different probe sphere radii.

If the probe sphere radius is known, it can be used for example in a subsequent calibration of the probe. Alternatively, the probe sphere radius may however in particular be determined by probing of a calibration body.

Figure 6:
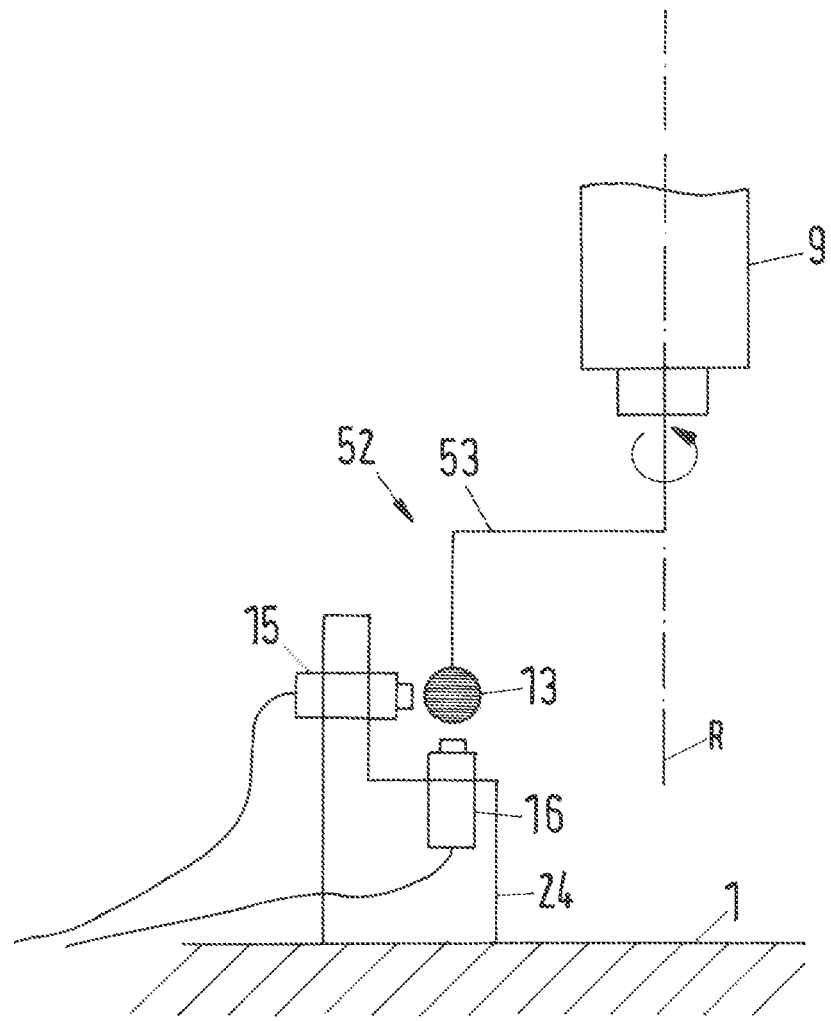

FIG. 6 shows, similarly to FIG. 2, a rotary apparatus having a probe pin 52 arranged thereon, which however has a probe pin shank 53 with a doubly angled profile. In the exemplary embodiment, that section of the probe pin shank 53 which is mounted on the probe sphere 13 of the probe pin 52 runs parallel to the axis of rotation R of the rotary apparatus 9, but the longitudinal axis of said section does not coincide with the axis of rotation R. During rotation of the rotary apparatus 9 about the axis of rotation R, the longitudinal axis of the stated shank section therefore changes its position but not its orientation. Therefore, if the probe sphere 13 is brought into the spatial region of the position determining device 24, and the position of the probe sphere 13 is determined, in each case in various rotary positions of the rotary apparatus 9, calibration information for the calibration of the rotary apparatus is obtained, whereby movement errors of the rotary apparatus (for example owing to a change in the orientation of the axis of rotation) can also be corrected. To bring the probe sphere 13 into the spatial region in each case in the various rotary positions, either the position of the rotary apparatus 9 is varied (this is preferred) or the position of the position determining device 24 is varied.

EP 1 624 282 A2, as already cited above, discloses for example a mathematical computing model by means of which a correction unit can correct errors of a rotary/pivot device (that is to say of a two-axis rotary apparatus). In particular, the equation of such a correction model is stated as equation 3 in paragraph 26 of the cited document. The equation and thus the computing model comprises, for each of the axes of rotation of the joint, the distance vector from a point on the respective axis of rotation to the probe sphere central point of a probe mounted on the joint. In the case of a simultaneous calibration of the rotary apparatus and of the probe mounted on the rotary apparatus, said vectors are calculated in each case individually for the mounted probe on the basis of the calibration information.

It has hitherto been the case that, in order to obtain the calibration information, the rotary apparatus has been brought into various rotary positions and, in each case in said rotary position, a calibration body such as for example the calibration sphere 41 illustrated in FIG. 4 has been probed at multiple surface points. Typically, for this purpose, twelve different rotary positions with respect to the same axis of rotation of the rotary apparatus are set, and for each rotary position, at least six surface points of the calibration body are probed. The time taken for this process ranges from 3 to 5 minutes.

According to the invention, using the position determining device, it is sufficient if, in each of the rotary positions, the probe sphere is brought into the spatial region of the position determining device and the position of the probe sphere is determined. The process of recording the calibration information therefore takes only a few seconds. In particular, use is made in each case of the position determining device 24 from FIG. 2 and FIG. 4, which has three sensors with determination directions which run along the axes of a Cartesian coordinate system.

With the calibration information thus obtained, it is possible, as is the case after the probing of surface points of a calibration body, to calculate the parameters to be determined of the model. In particular, the stated distance vectors from the respective point on the axis of rotation of the rotary apparatus to the central point of the probe sphere can be calculated from the calibration information. This calculation can even be performed more simply if the position of the probe sphere is determined while the central point of the probe sphere is, for example in one variant of the approach described above, always situated at a predefined point in relation to the position determining device.

As an alternative to the obtainment of the calibration information at the same rotary positions as previously in the case of the probing of multiple surfaces of a calibration body, the probe sphere can be brought into the spatial region of the position determining device, and the position thereof determined, in a greater number of rotary positions than previously. In this way, the accuracy of the calibration can be improved.

Figure 7:
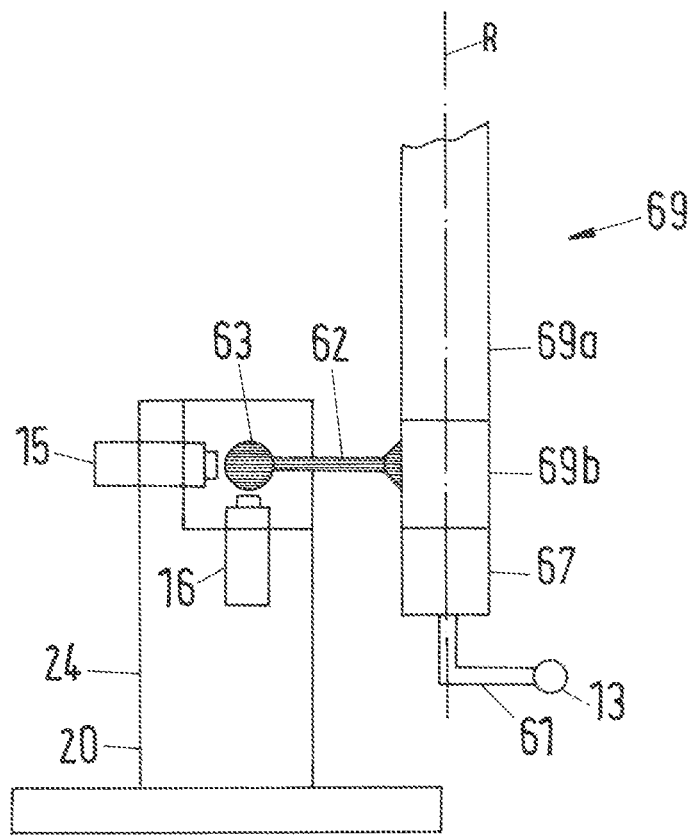

FIG. 7 shows an arrangement similar to that in FIG. 2. In particular, the position determining device 24 with the holder 20 and the sensors 15, 16 and 17 may be designed as illustrated in FIG. 2 and as described on the basis of FIG. 2.

As part of the CMM, FIG. 7 illustrates only the rotary apparatus 69, which is mounted on the movable part (not illustrated in FIG. 7) of the CMM. The rotary apparatus 69 has a first part 69a and a second part 69b, which is rotatable relative to the first part 69a about the axis of rotation R, which runs in the vertical direction in the exemplary embodiment, of the rotary apparatus 69. In the exemplary embodiment, the second part 69b is situated below the first part 69a. In turn, below the second part 69b, there is situated a measuring head 67 which is mounted rotationally conjointly on the second part 69b (that is to say is rotatable about the axis of rotation R only together with the second part 69b). Furthermore, a probe pin 61 is arranged rotationally conjointly on the measuring head 67, the shank of which probe pin, proceeding from the measuring head 67, firstly extends with its longitudinal axis vertically downward and then bends and runs with its longitudinal axis angled through 90° relative to the vertical. On the free end of the shank there is situated a probe sphere 13 for the tactile probing of objects, in particular for the purposes of determining coordinates of the respectively probed surface point of the object. Since both the measuring head 67 and the probe pin 61 are mounted rotationally conjointly on the second part 69b, a rotation of the second part 69b relative to the first part 69a about the axis of rotation R leads to a rotation of the longitudinal axis of the probe pin shank in the angled section of the shank about the axis of rotation R. With regard to the coordinate system illustrated in FIG. 1, this means that said longitudinal axis runs in the X-Y plane and, within said plane, is rotated about the axis of rotation R running perpendicular to said plane.

Furthermore, a spherical body 63 is fastened to the second part 69b by means of a shank 62, which spherical body is, in the illustrated movement state of the CMM, positioned in the spatial region of the position determining device 24. Since there is fastened to the second part of the rotary apparatus a body which is utilized for the determination of the calibration information for the calibration of the rotary apparatus, it is not necessary for a probe pin to be fastened to the rotary apparatus for the obtainment of the calibration information. By contrast to the illustration in FIG. 7, it is thus possible, for the calibration of the rotary apparatus, for the measuring head 67 and also the probe pin 61 to be decoupled from the rotary apparatus 69. In particular, a different measuring head and/or a different probe pin may be coupled to the second part 69b of the rotary apparatus 69 while the body 63 is arranged in the spatial region of the position determining device 24. Alternatively, it is possible for no measuring head and no probe to be arranged on the second part of the rotary apparatus. In turn, as already described above, instead of the measuring head 67, an object of the same mass may be arranged on the second part 69b.

Instead of the rotary apparatus 69 in FIG. 7, which has a single axis of rotation R, some other rotary apparatus with a differently oriented single axis of rotation, or with multiple axes of rotation, may be mounted on the CMM. It is however preferable for a body to be arranged in each case on the second part of the rotary apparatus (in the case of a single axis of rotation) or on the final part of the rotary apparatus (in the case of multiple axes of rotation), such that no probe pin has to be coupled to the rotary apparatus for the obtainment of the calibration information. Also, the body enables the obtainment of the calibration information to be possible always in the same way, even though, for example, different probes and/or measuring heads are mounted in succession on the rotary apparatus. It is thus possible for the body to be brought into the spatial region of the position determining device, and for calibration information relating to the rotary apparatus to be obtained, even after a change of the measuring head and/or probe for the purposes of carrying out different measurement tasks in the determination of coordinates of a workpiece in any operating phase (for example in each case after the fitting of a different measuring head and/or probe).

The invention claimed is:

1. A method for calibrating a rotary apparatus mounted on a movable part of a coordinate measuring machine, which rotary apparatus has a first part, which is fastened to the movable part of the coordinate measuring machine, and a second part which is rotatable relative to the first part about an axis of rotation of the rotary apparatus and on which a measurement sensor for measuring workpieces is mountable, including the steps of:
    moving the rotary apparatus, or a body connected to the second part, by operation of a drive system of the coordinate measuring machine, into a spatial region of a position determining device which is connected to a base of the coordinate measuring machine,
    determining a position of the rotary apparatus, or of the body connected to the second part, relative to the position determining device by means of a plurality of sensors arranged on the position determining device, wherein the position relative to the position determining device is determined with respect to a plurality of linear degrees of freedom of movement by means of the plurality of sensors,
    bringing the rotary apparatus into different rotary positions and, in each of the different rotary positions, determining the position of the rotary apparatus, or of the body connected to the second part, relative to the position determining device by means of the plurality of sensors of the position determining device while the rotary apparatus, or the body connected to the second part, is situated in the spatial region of the position determining device, and
    calibrating the rotary apparatus in accordance with the positions determined by means of the plurality of sensors of the position determining device.

2. The method as claimed in claim 1, wherein the rotary apparatus, or the body connected to the second part, is moved to a predefined position in a coordinate system of the position determining device, and, by means of a measuring system of the coordinate measuring machine, which measuring system is provided in addition to the position determining device and which measuring system, during a measurement operation of the coordinate measuring machine for determining coordinates of workpieces, measures movement positions of the movable part, measures the movement position at which the movable part with the rotary apparatus mounted thereon is situated while the rotary apparatus, or the body connected to the second part, is at the predefined position, and wherein the rotary apparatus is calibrated in accordance with the measured movement position.

3. The method as claimed in claim 1, wherein the movable part with the rotary apparatus mounted thereon is moved into a predefined position in a coordinate system of the coordinate measuring machine, and in the predefined position, the position of the rotary apparatus, or of the body connected to the second part, relative to the position determining device is determined.

4. The method as claimed in claim 1, wherein at least one of the plurality of sensors of the position determining device is a distance sensor which performs measurement contactlessly.

5. The method as claimed in claim 1, wherein the position determining device has at least two sensors by means of which the position of the rotary apparatus, or of the body connected to the second part, relative to the position determining device is determined, wherein each of the at least two sensors has a determination direction in which it determines the position of the rotary apparatus, or of the body connected to the second part, relative to the position determining device, and wherein the determination directions of the at least two sensors are perpendicular to one another in pairs.

6. An arrangement for calibrating a rotary apparatus mounted on a movable part of a coordinate measuring machine, comprising:
    the coordinate measuring machine, wherein the coordinate measuring machine has a base relative to which the movable part is movable by operation of a drive system of the coordinate measuring machine,
    the rotary apparatus, which is mounted with a first part on the movable part of the coordinate measuring machine and which has a second part, which second part is rotatable relative to the first part about an axis of rotation of the rotary apparatus and on which second part a measurement sensor for measuring workpieces is mountable,
    a measuring system of the coordinate measuring machine, which measuring system, during a measurement operation of the coordinate measuring machine for determining coordinates of workpieces, measures movement positions of the movable part,
    a position determining device which is provided in addition to the measuring system of the coordinate measuring machine, which is connected to the base of the coordinate measuring machine and which has a plurality of position sensors arranged thereon for determining a position of the rotary apparatus or of a body connected to the second part,
    a controller of the coordinate measuring machine, which controller is designed to move the rotary apparatus, or the body connected to the second part, by operation of the drive system of the coordinate measuring machine, into a spatial region of the position determining device such that the position of the rotary apparatus, or of the body connected to the second part, relative to the position determining device is determined by means of the plurality of position sensors, wherein the position relative to the position determining device is determined with respect to a plurality of linear degrees of freedom of movement by means of the plurality of sensors, wherein the controller is designed to position the rotary apparatus, or the body connected to the second part, in the spatial region of the position determining device, in different rotary positions of the rotary apparatus, such that, in each of the different rotary positions, the position of the rotary apparatus, or of the body connected to the second part, relative to the position determining device is determined by means of the plurality of position sensors while the rotary apparatus, or the body connected to the second part, is situated in the spatial region of the position determining device, and a calibrating device which is designed to calibrate the rotary apparatus in accordance with the determined positions.

7. The arrangement as claimed in claim 6, wherein the controller is designed to move the rotary apparatus, or the body connected to the second part, to a predefined position in a coordinate system of the position determining device, wherein the measuring system of the coordinate measuring machine is designed to measure the movement position the movable part with the rotary apparatus mounted thereon is situated at while the rotary apparatus, or the body connected to the second part, is at the predefined position, and wherein the calibrating device is designed to calibrate the rotary apparatus in accordance with the measured movement position.

8. The arrangement as claimed in claim 6, wherein the controller is designed to move the movable part with the rotary apparatus mounted thereon into a predefined position in a coordinate system of the coordinate measuring machine, and wherein the position determining device is designed to determine, in the predefined position, the position of the rotary apparatus, or of the body connected to the second part, relative to the position determining device.

9. The arrangement as claimed in claim 6, wherein at least one of the plurality of sensors of the position determining device is a distance sensor which performs measurement contactlessly.

10. The arrangement as claimed in claim 6, wherein the position determining device has at least two sensors by means of which the position of the rotary apparatus, or of the body connected to the second part, relative to the position determining device is determined, wherein each of the at least two sensors has a determination direction in which it determines the position of the rotary apparatus, or of the body connected to the second part, relative to the position determining device, and wherein the determination directions of the at least two sensors are perpendicular to one another in pairs.

* * * * *